June 19, 1956 E. A. VON SEGGERN 2,750,959
VALVE OF RELATIVE MOVABLE FLEXIBLE DIAPHRAGMS
Filed Dec. 4, 1951 3 Sheets-Sheet 2
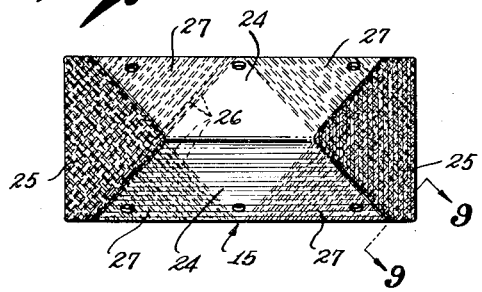
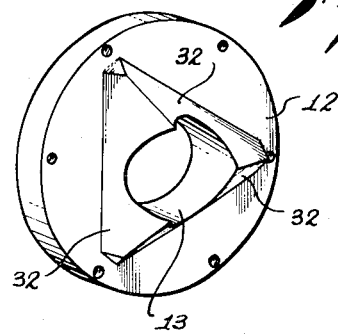
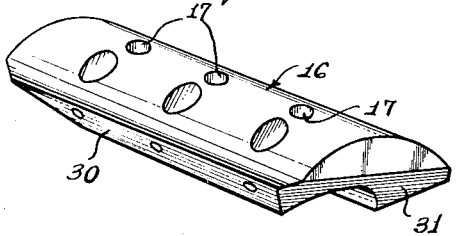
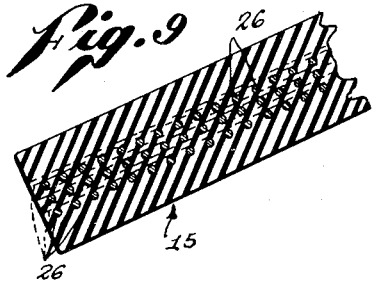
INVENTOR.
ERNEST VON SEGGERN
BY
Attorney June 19, 1956  E. A. VON SEGGERN  2,750,959
VALVE OF RELATIVE MOVABLE FLEXIBLE DIAPHRAGMS
Filed Dec. 4, 1951  3 Sheets-Sheet 3
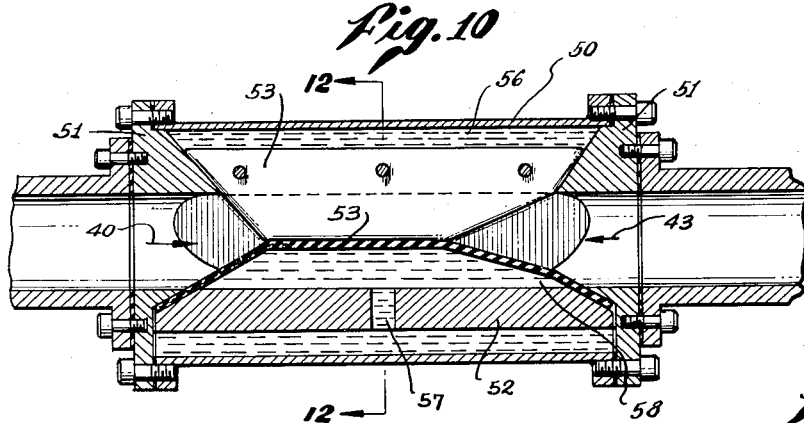
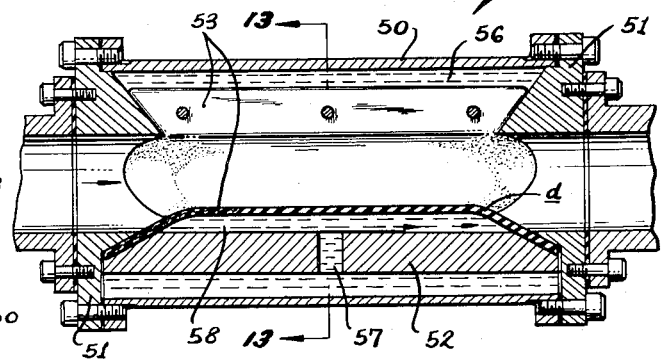
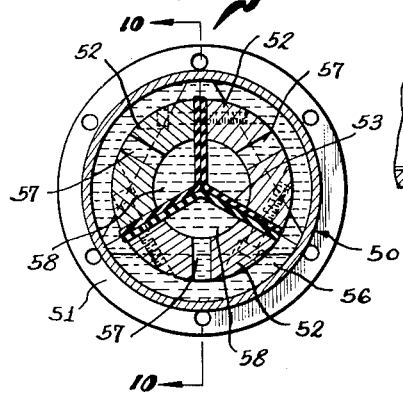
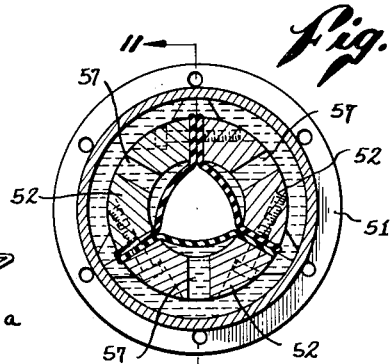
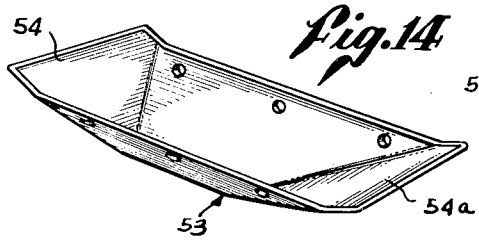
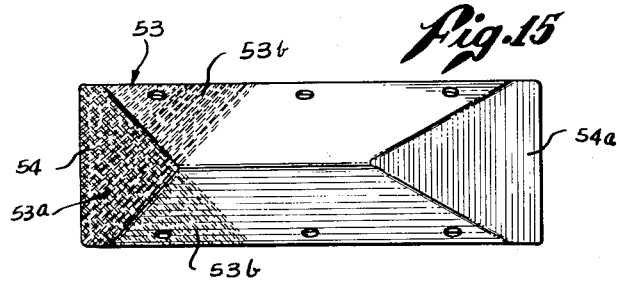
INVENTOR.
ERNEST VON SEGGERN
BY
Attorney

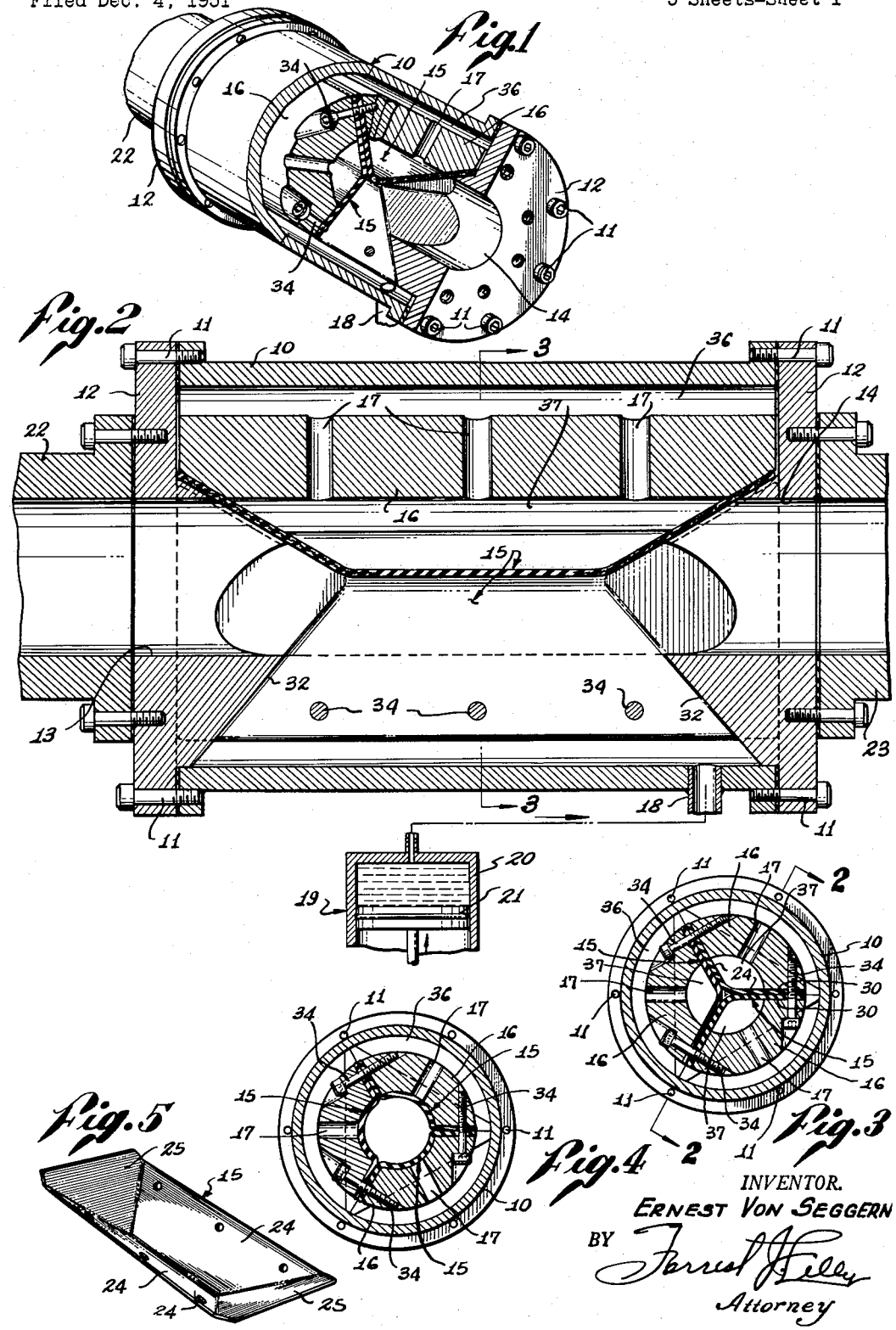

United States Patent Office 2,750,959
Patented June 19, 1956

2,750,959

VALVE OF RELATIVE MOVABLE FLEXIBLE DIAPHRAGMS

Ernest A. von Seggern, Burbank, Calif., assignor to Soundrive Pump Company, Hollywood, Calif., a corporation of California Application December 4, 1951, Serial No. 259,784

9 Claims. (Cl. 137—525)

This invention relates generally to valves, and particularly to a valve capable of offering a minimum flow resistance when open and of withstanding high pressures when closed. It relates specifically to a valve to be used in combination with a displacement pump adapted for pumping viscous, abrasive, semi-fluid mixtures of pulverized solids and liquids which may include solid particles of considerable size. Examples of such mixtures are interior plaster, exterior stucco, cemet in combination with aggregates, ceramic material in a semi-fluid state, and similar mixtures of solids and liquids in stable or unstable suspension.

In order to obtain satisfactory operation, the valve must be capable of opening into a smooth, unobstructed, cylindrical bore and also be capable of closing tightly against high back pressure even when passing material containing solid aggregates of considerable size or other rigid material.

The valve of the invention, in a preferred form, provides a plurality of flexible elastic diaphragms nested together to form an annulus, and in back of or outside these diaphragms are fluid filled chambers equipped with a fluid displacing device by which the fluid may be pumped alernately towards and from the diaphragms. In the first instance, the diaphragms close radially with one another, and in the second, the diaphragms are radially expanded, and a fluid passage therebetween is provided. In the event that solid objects carried by the fluid, such as rocks or the like, should become entrapped within the valve, the diaphragms close and seal therearound as effectively as though the rocks were not present.

It is accordingly an object of the present invention to provide a valve which will open into a smooth cylindrical bore without any obstruction, or crevices in which solid material can lodge, and which will provide a minimum flow resistance.

A further object is to provide a valve which will close tightly against high back pressure regardless of whether the closure is clean or contains irregularly shaped solid objects.

A further object is to provide a valve whose closure surfaces in contact with abrasive materials are made of rubber or similar flexible, abrasion-resistant material.

A further object is to provide a valve which may be self operated by the pressure of the material being pumped therethrough, or may be operated by independent means.

A further object is to provide a valve of the above class which is simple in design, positive in action, and which will not readily deteriorate or get out of order.

The invention will be better understood from the following detailed description of certain illustrative embodiments thereof, reference for this purpose being had to the accompanying drawings, in which:

Figure 1 is a cutaway perspective view of a preferred form of valve in accordance with the invention;

Figure 2 is a longitudinal medial section taken through the valve of Figure 1, the section being taken in accordance with line 2—2 of Figure 3;

Figure 3 is a transverse section taken on line 3—3 of Figure 2, the valve being shown in closed position;

Figure 4 is a view similar to Figure 3, but with the valve in open position;

Figure 5 is a perspective view of a diaphragm employed in the valve of Figures 1 to 4;

Figure 6 is a plan view of the diaphragm;

Figure 7 is a perspective view of an end ring of the valve;

Figure 8 is a perspective view of a clamping plate;

Figure 9 is an enlarged detail section taken in accordance with line 9—9 of Figure 6;

Figure 10 is a longitudinal medial section of another embodiment of the invention, the valve being shown in closed position, and the section being taken in accordance with line 10—10 of Figure 12;

Figure 11 is a view similar to Figure 10, but showing the valve in open position, the view being taken in accordance with line 11—11 of Figure 13;

Figure 12 is a section taken on line 12—12 of Figure 10;

Figure 13 is a section taken on line 13—13 of Figure 11;

Figure 14 is a perspective view of a diaphragm employed in the valve of Figures 10 to 13;

Figure 15 is a plan view of the diaphragm of Figure 14.

In the embodiment of Figures 1–9, the valve body includes a cylindrical shell 10, secured as by screws 11 to end ring fittings 12. The latter have large fluid inlet and outlet openings 13 and 14. A plurality of flexible diaphragms 15, here three in number, are clamped between end fittings 12 and a corresponding plurality of arcuate clamp plates 16, the latter having fluid ports 17, as indicated. Connected into shell 10, as by conduit 18, is any suitable fluid displacing device 19, for instance, a cylinder 20 containing a reciprocable piston 21. External piping is coupled to the two end rings, as indicated at 22 and 23.

The diaphragms 15 are made of a flexible, elastic substance, preferably rubber or similar material not subject to abrasion by the material to be handled. While these diaphragms may be flat sheets of rubber or the like, bent into proper shape by their mounting arrangements, they are preferably molded in a normal "trough" shape. Thus the diaphragm has two converging, substantially trapezoidal sides 24 forming a dihedral angle of 120° and joining one another to form the diaphragm bottom, and two ends 25, making an obtuse angle of, for example, about 150° with the diaphragm bottom. The two sides 24, in their undistended condition, do not necessarily meet at a sharp angle, but instead may form a somewhat rounded bottom. The two ends 25 are reinforced, in any suitable manner, to prevent substantial elastic stretching in any direction, and these portions of the diaphragm are therefore flexible but not subject to elastic stretch. This may be accomplished in any one of various evident ways, as by use of a separate backing layer of non-stretching fabric, which may be cemented to the end portions 25, or simply supported thereadjacent, or, a fabric may be molded within the end portions 25. Preferably and as here shown, multiple layers of diagonally crossing non-elastic cords 26, such as used in rubber tire manufacture, are molded within the triangular end portions 25. These may be placed and fastened in accordance with techniques well known in tire manufacture. As here shown, the layers of cords 26 extend beyond the end portions 25 to provide layers of single direction cords over triangular areas 27 of the sides at the two ends of the latter. It will be seen that these single direction diagonally disposed cords are clamped at their ends remote from the diaphragm ends 25 between the clamp plates 16, and thus serve to prevent distention of the reinforced diaphragm ends during operation. Between the areas 27, the sides of the diaphragm are capable of being freely stretched in any direction.

The side edges of the diaphragms are clamped between the longitudinal edges 30 of adjoining clamp plates 16, while the end edges are clamped between beveled surfaces 31 at the ends of plates 16 and corresponding flat, angularly disposed surfaces 32 on end rings 12. The three clamp plates 16 are assembled with one another, with the side edges of the diaphragms clamped therebetween, by means of screws 34. The end plates then are engaged with opposite ends of the assembly of clamp plates and diaphragm, and when the screws 11 are tightened, the end edges of the diaphragm are clamped, and the assembly of clamp plates and diaphragms is centered inside the shell 10.

Finally, the space 36 inside the shell, the communicating spaces 37 inside the diaphragms, and the line 18 and fluid displacing means 19 are completely filled with a fluid, preferably incompressible, such as water, although gases can be used in some cases.

The valve is shown in closed position in Figures 1, 2 and 3, and in open position in Figure 4. To hold the valve closed against any applied pressure through the inlet opening 13, a force is applied to the piston 21 which forces fluid against the inner walls of the three diaphragms 15. As seen in Figure 3, the central portions of the diaphragms are thereby forced against one another, forming three 120° angles at the center. The valve is thus closed. Since all radial forces are balanced, no increase in applied force on the piston 21 can further deform the rubber.

The longitudinal forces in the fluid inside the diaphragms act against the exposed end sections 25. There hydraulic forces on the diaphragm are unbalanced, and the crossed cords 26 resist the force. For this reason the end sections 25 are made non-elastic, though flexible. The single direction layers of cords 26 which extend into the sides 24 of the diaphragm, within the triangular areas 27, provide tensile strength for the support of said triangular sections 27 against the longitudinal hydraulic forces developed inside the diaphragm space 37.

To open the valve, the force on piston 21 is reversed so as to draw fluid from the diaphragm spaces 37 into the space 36 and toward cylinder 20. This causes the diaphragms to flex or collapse radially outward and conform to the inner contour of the clamp plates 16, as shown in Figure 4. In this way a straight, unobstructed passage is formed which permits the passage of any kind of fluid or semi-fluid material, including or containing a mixture of solid objects, small enough to pass through the valve opening.

A primary virtue of the valve is its ability to close tightly even with solid objects trapped within it. When hydraulic pressure is applied to the diaphragms as explained above, and they close toward each other, it is apparent that, being elastic and flexible, they have the ability to surround and clasp tightly any object that may be either partly or wholly within the valve, the valve closing tightly around the object. On the succeeding cycle when the valve is open, such objects are entirely released, so that they are free to pass on. The valve is thus non-leaking and non-clogging.

A second form of valve is shown in Figures 10 to 15. This valve has shell 50, end rings 51, and clamp plates 52, exactly like the corresponding components of the previously described embodiment. The diaphragms 53, again illustratively three in number, are generally similar to those of the first-described embodiment, but are reenforced with cords at only the intake end of the valve, as indicated at 54 in Figure 15, the remainder of the valve being left entirely free of reenforcement so as to be capable of substantial elastic stretch. Thus the one end portion 53a has crossed cords, which extend out as single direction cords over the triangular areas 53b. In addition, the opposite or elastic end portion 54a of the diaphragm is preferably formed at a somewhat increased obtuse angle with respect to the diaphragm bottom, as clearly illustrated in Figures 10, 14 and 15.

In this case, no external fluid displacing means is employed. A fluid, preferably incompressible, is however enclosed in the space 56 inside shell 50, and fills in, through ports 57 in clamp plates 52, inside the diaphragm space 58.

The valve is shown in closed position in Figures 10 and 12, the diaphragms preferably being molded in such shape as normally to touch one another, or nearly so. When a fluid or other mobile material is forced against the exposed reenforced end portions 54 of the diaphragms, in the direction of the arrow 40 in Figure 10, the diaphragms are forced longitudinally inward and the fluid displaced thereby moves to the opposite end of the diaphragm, distending the large elastic opposite end portion 54a, as indicated at d in Figure 11. Because of the ability of the elastic end area to distend and thus accommodate the fluid displaced as a result of the applied end pressure on the diaphragms, the diaphragms open, as shown in Figure 13, and the fluid is able to pass through the valve.

When the applied force owing to the pressure of the entering fluid is reduced to a value lower than the restoring force due to tension in the distended areas of the diaphragms, the diaphragms close.

When back pressure, as indicated by the arrow 43, is applied to the valve, this pressure acts on the exposed external elastic end surfaces of the diaphragms, and the resulting force is transmitted directly to the fluid within the diaphragms. This force tends to expand and close the diaphragms, and the larger the back pressure, the tighter the closure. In this way the valve resists back pressure forces which might otherwise cause leakage.

In common with the earlier-described embodiment, the valve closes tightly even if solid objects become trapped within it. The elastic diaphragms readily deform and stretch to enclose and seal around any such object that is either wholly or partly within the valve.

The drawings and description are of course to be understood as for illustrative purposes only, and various changes in design, structure and arrangement may be made without departing from the spirit and scope of the appended claims.

I claim:

1. A valve diaphragm of elastic material and of trough shape, having substantially trapezoidal elastic sides joining one another to form a bottom, said trough-shaped diaphragm having two ends making obtuse angles with said bottom, and reinforcing means for said ends making said ends substantially non-elastic in all directions.

2. A valve diaphragm of elastic material and of trough shape, having substantially trapezoidal elastic sides joining one another to form a bottom, said trough-shaped diaphragm having two reinforced non-elastic ends making obtuse angles with said bottom, and means anchoring said reinforced ends of said diaphragm against longitudinal distention.

3. A valve diaphragm of elastic material and of trough shape, having substantailly trapezoidal elastic sides joining one another to form a bottom, said trough-shaped diaphragm having two ends making obtuse angles with said bottom, and reinforcing material embedded in said diaphragm ends to make said ends substantially non-elastic in all directions, portions of said reinforcing material extending from said ends diagonally through adjacent portions of the sides of said trough-shaped diaphragm to anchor said ends against longitudnial distention.

4. A valve diaphragm of elastic material and of trough shape, having substantially trapezoidal sides joining one another to form a bottom, said trough-shaped diaphragm having two ends making obtuse angles with said bottom, and layers of parallel reinforcing cords embedded in said diaphragm ends, with the cords of different layers crossing one another to render said diaphragm ends non-elastic in two directions.

5. A valve diaphragm of elastic material and of trough shape, having substantially trapezoidal sides joining one another to form a bottom, said trough-shaped diaphragm having two ends making obtuse angles with said bottom, layers of parallel reinforcing cords embedded in said diaphragm ends, the cords of different layers lying in crossing diagonals extending from the end edges of the diaphragm through the diaphragm ends and to the longitudinal edges of the diaphragm sides, whereby to form overlying layers of crossing cords in the diaphragm ends, and single direction diagonal cords in triangular areas at opposite ends of each diaphragm side, the central diaphragm portion being elastic.

6. A valve diaphragm of elastic material and of trough shape, having substantially trapezoidal elastic sides joining one another to form a bottom, said trough-shaped diaphragm having two ends making obtuse angles with said bottom, and reinforcing material embedded in at least one end of said diaphragm to make said end substantially non-elastic in all directions.

7. A valve diaphragm of elastic material and of trough shape, having substantially trapezoidal sides joining one another to form a bottom, said trough-shaped diaphragm having two ends making obtuse angles with said bottom, layers of parallel reinforcing cords embedded in at least one of said diaphragm ends, the cords of different layers lying in crossing diagonals extending from the edge of said diaphragm end through the diaphragm end and to the longitudinal edges of the diaphragm sides, whereby to form overlying layers of crossing cords in said diaphragm end, and single direction diagonal cords in triangular areas adjacent said diaphragm end.

8. In a valve, the combination of: a housing having inlet and outlet ports, a plurality of flexible diaphragms enclosing a fluid passage extending from said fluid inlet to said fluid outlet, said diaphragms having longitudinal and end edge portions, means rigidly clamping said longitudinal and end edge portions of said diaphragms in fixed positions about said fluid passage, said housnig enclosing a fluid pressure chamber around said diaphragms, whereby delivery of pressure fluid to said chamber tends to distend said diaphragm toward and into sealing engagement with one another to close said passage, and said diaphragms having central elastic portions capable of free elastic distention to engage one another, and non-engaging portions extending said engageable elastic central portions to the rigidly clamped opposite ends edge portions of the diaphragms, said non-engaging portions being reinforced to be non-elastic in all directions, so as to prevent distention and blowout through said non-engaging portions.

9. The valve of claim 8, wherein there are three of said diaphragms, arranged with their longitudinal edges adjacent one another, and wherein said diaphragms are essentially trough-shaped, and include elastic side wall portions making an approximately 120° angle with one another, and end walls reinforced to be non-elastic in all directions.

References Cited in the file of this patent

UNITED STATES PATENTS

| | | |
|---|---|---|
| 2,247,363 | Dunn | July 1, 1941 |
| 2,467,150 | Nordell | Apr. 12, 1949 |
| 2,487,226 | Eastman | Nov. 8, 1949 |
| 2,598,207 | Bailey | May 28, 1952 |
| 2,627,874 | Johnson | Feb. 10, 1953 |

FOREIGN PATENTS

| | | |
|---|---|---|
| 540,685 | Great Britain | Oct. 27, 1941 |